United States Patent
Luo et al.

(10) Patent No.: US 11,138,110 B1
(45) Date of Patent: Oct. 5, 2021

(54) DATA MANAGEMENT FOR MEMORY DEVICES

(71) Applicant: Sage Microelectronics Corporation, Campbell, CA (US)

(72) Inventors: Jianjun Luo, Campbell, CA (US); Hailuan Liu, Zhejiang (CN); Chris Tsu, Campbell, CA (US)

(73) Assignee: Sage Microelectronics Corporation, Campbell, CA (US)

( * ) Notice: Subject to any disclaimer, the term of this patent is extended or adjusted under 35 U.S.C. 154(b) by 0 days.

(21) Appl. No.: 16/864,070

(22) Filed: Apr. 30, 2020

(51) Int. Cl.
*G06F 12/0804* (2016.01)
*G06F 12/1009* (2016.01)
*G06F 13/16* (2006.01)

(52) U.S. Cl.
CPC ...... *G06F 12/0804* (2013.01); *G06F 12/1009* (2013.01); *G06F 13/1668* (2013.01)

(58) Field of Classification Search
None
See application file for complete search history.

(56) References Cited

U.S. PATENT DOCUMENTS

| | | | |
|---|---|---|---|
| 8,526,234 B1 * | 9/2013 | Asnaashari | G06F 13/00 365/185.17 |
| 2005/0177679 A1 * | 8/2005 | Alva | G06F 11/1064 711/104 |
| 2014/0122780 A1 * | 5/2014 | Smith | G06F 12/0866 711/103 |
| 2015/0324284 A1 * | 11/2015 | Kim | G06F 12/0246 711/103 |

* cited by examiner

*Primary Examiner* — Gary W. Cygiel
(74) *Attorney, Agent, or Firm* — Joe Zheng

(57) ABSTRACT

Designs of persistently managing mapping tables are described. To keep the performance of writing data into or reading out data from a storage device, such as flash memory, RAM (Random Access Memory) is often used to manage the mapping tables. To prevent the mapping tables from being damaged for whatever reason (e.g., power failure), MRAM (Magnetic RAM) is employed to keep the mapping tables in magnetic domains while the RAM is only used for updating the content of the mapping tables. Not only is the capacity for RAM is significantly reduced, the mapping tables are securely maintained in MRAM and available to RAM while data is being written into or read out from the storage device.

18 Claims, 6 Drawing Sheets

DATA MANAGEMENT FOR MEMORY DEVICES

BACKGROUND OF THE INVENTION

Field of Invention

The invention generally is related to the area of data management for storage, and more particularly related to controllers for data management and storage devices, especially for flash memories.

Related Art

Various electronic data is being created every moment. Retaining or storing the data is increasingly demanded than ever. Various technologies and devices have been developed to store the data. Data storage often includes hardware components and recording media to retain the digital data. Examples of the recording media include punch cards, hard drive disks, floppy disks, magnetic tapes, optical discs and semiconductors. Among the semiconductor-based recording media, flash memory is a type of nonvolatile memory that can be electrically erased and reprogrammed and is being used in many applications. One common use of the flash memory is the solid state drives (SSD) that can hold enormous amounts of data in very small size, enabling various kinds of new applications for many industries as well as consumer uses.

RAM (Random Access Memory), however, is often used in controllers in SSD devices. They are used to manage mapping tables to translate from local address to physical address of data bits in the flash memory. Although both RAM and flash memory fall into the category of solid-state storage and are made up of solid-state chips, the way they are made, their performance specifications and the relative costs give them entirely different roles in an electronic system. By their nature, although both flash memory and RAM are faster than storage alternatives, such as hard disk and tape, RAM is much faster than flash, but it is also much more expensive. There are two types of RAM commonly used: dynamic RAM (DRAM) and static RAM (SRAM). In addition to being the fastest option, SRAM is much more expensive than DRAM. In many applications, SRAM is mainly used as the cache memory (e.g., in a CPU) while DRAM is mainly used as the primary operational memory (e.g., running the OS and applications).

FIG. 1 shows an exemplary architecture of Solid State Device (SSD) 100 that includes an SSD controller 102, a RAM buffer 104, a flash memory package 106 and an interface 108. The SSD controller 102 manages the data stored on flash memory package 106 and communicates with a host device. When a host system or device needs to read data from or write data into the SSD 100, it communicates with the SSD controller 102. Through the interface 108 (e.g., eSATA, USB, eMMC, CF cards, SD/micro SD cards and PCIe), data from a host device (not shown) is coupled in, processed in the SSD controller 102 and stored in the recording media 106, namely the flash memory package or arrays. To keep track of how the data is organized on the media 106, a mapping table is maintained by the SSD controller 102, where the mapping table records where the data or data bits are stored in the flash memory arrays 106. To satisfy the speed requirement, the RAM (often DRAM) 104 is provided to manage the mapping table immediately available for caching data being written into or read out from the flash memory arrays 106, hence RAM 104 is also referred to as RAM buffer. As the data is going through the controller 102, the mapping table is being updated in the RAM buffer. Should the power to the SSD 100 or the controller 102 be interrupted, the mapping table would be damaged, resulting in the loss of the data in the flash memory arrays 106. Thus there is a great need for solutions that would prevent the loss of data while the data is going through an SSD or a controller therein.

SUMMARY OF THE INVENTION

This section is for the purpose of summarizing some aspects of the present invention and to briefly introduce some preferred embodiments. Simplifications or omissions in this section as well as in the abstract may be made to avoid obscuring the purpose of this section and the abstract. Such simplifications or omissions are not intended to limit the scope of the present invention.

The present invention generally pertains to data management for storage devices. According to one aspect of the present invention, method and apparatus for persistently managing mapping tables are described. To keep the performance of writing data into or reading out data from a storage device, such as flash memory, RAM (Random Access Memory) is often used to manage the mapping tables. To prevent the mapping tables from being damaged for whatever reason (e.g., power failure), MRAM (Magnetoresistive random-access memory or Magnetic RAM) is employed to keep the mapping tables in magnetic domains while the RAM is only used for updating the content of the mapping tables. Not only is the capacity for RAM is significantly reduced, the mapping tables are securely maintained in MRAM and available to RAM while data is being written into or read out from the storage device.

According to another aspect of the present invention, the RAM and the MRAM are coupled via a data bus. Only respective portions of the mapping tables are being updated in the RAM. When writing data bits into a flash memory, the portions of the mapping tables being updated in the RAM are moved to the MRAM, leaving a space for the RAM to continue another portion of the mapping tables. The updated portions of the mapping tables are cascaded in the MRAM. In an event the portions of the mapping tables are damaged in the RAM, the portions that have just been moved to MRAM can be returned to the RAM to allow the RAM to continue the writing process.

According to still another aspect of the present invention, respective portions of the mapping tables and various data (e.g., backup data) are being updated in the RAM. When reading out data bits from a flash memory, the mapping tables are first loaded into the MRAM. A portion of the mapping tables in the MRAM are copied to the RAM, where the respective portions of the mapping tables are updated. As data bits are being read out, more portions of the data tables are copied from the MRAM to RAM while discarding the previous portions of the mapping tables. The respective portions of the mapping tables are referenced or updated in the RAM.

According to another aspect of the present invention, the sizes of the respective portions of the mapping tables in the RAM are predetermined (e.g., 1K or 4K). In general, the capacity of the RAM gets smaller if the sizes of the respective portions of the mapping tables in the RAM are small but may increase the frequency of moving the portions of the mapping tables from the MRAM to the RAM or vice versa.

According to yet another aspect of the present invention, the respective functions of the RAM and MRAM are swapped as opposed to other aspects described herein. The MRAM is provided to update the mapping tables and the RAM is employed as a cache and coupled to the flash memory for final deposit of the mapping tables when ongoing writing or reading process is completed. In the event of power failure while writing data into or reading data from the flash memory, the data cached in the RAM would be damaged but some of all of the content in the MRAM can be copied to the RAM to continue the writing or reading process.

The present invention may be implemented as an apparatus, a method, and a part of system. Different implementations may yield different benefits, objects and advantages. In one embodiment, the present invention is a storage system comprising a magnetoresistive random access memory or magnetic RAM (MRAM) provided to maintain at least one mapping table to track where data bits of a file are stored in flash memory; and a random access memory (RAM), coupled to the MRAM via a data bus, provided to update some or all of the at least one mapping table, wherein the RAM maintains a portion of the at least one mapping table, the portion of the at least one mapping table is actively updated in the RAM as data bits are being written into or read out from the flash memory, wherein the portion of the at least one mapping table in the RAM is damaged and the at least one mapping table in the MRAM is maintained when there is a power failure to the storage system.

In another embodiment, the present invention is a method implemented in a storage system, the method comprises: maintaining respective portions of mapping tables in a random access memory (RAM) while keeping the mapping tables a magnetoresistive random access memory or magnetic RAM (MRAM); updating contents in the respective portions of mapping tables in RAM when data bits pertaining to a file are being written into or read out from a flash memory; moving the respective portions of mapping tables in RAM to the MRAM periodically when the data bits are being written into the flash memory; or moving the respective portions of mapping tables in MRAM to the RAM periodically when the data bits are being read out from the flash memory. The RAM and the MRAM are coupled via a data bus. The respective portions of the mapping tables in the RAM are damaged but the mapping tables in the MRAM are maintained when there is a power failure to the storage system.

One of advantages, benefits and advantages of the present invention is to provide an alternative memory to timely cache important data including mapping tables, where the alternative memory is not prone to power interruption and return the data to a working memory to continue an ongoing process. There are many other advantages, benefits and advantages, together with the foregoing attained in the exercise of the invention in the following description and resulting in the embodiment illustrated in the accompanying drawings.

BRIEF DESCRIPTION OF THE FIGURES

These and other features, aspects, and advantages of the present invention will be better understood with regard to the following description, appended claims, and accompanying drawings where:

DETAILED DESCRIPTION OF THE INVENTION

The detailed description of the invention is presented largely in terms of procedures, steps, logic blocks, processing, and other symbolic representations that directly or indirectly resemble the operations of communication or storage devices that may or may not be coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

One of the important objects, advantages and benefits in the present invention is to use MRAM to manage a mapping table or mapping tables. MRAM stands for Magnetoresistive Random-Access Memory or magnetic RAM and is a type of non-volatile random-access memory which stores data in magnetic domains. Unlike conventional RAM chip technologies, data in MRAM is not stored as electric charge or current flows, but by magnetic storage elements, hence the data won't be lost when there is a disruption in power to MRAM. The storage elements are formed from two ferromagnetic plates, each of which can hold a magnetization, separated by a thin insulating layer. One of the two plates is a permanent magnet set to a particular polarity, the other plate's magnetization can be changed to match that of an external field to store memory. This configuration is known as a magnetic tunnel junction and is the simplest structure for an MRAM bit. A memory device is built from a grid of such cells.

Figure 1:
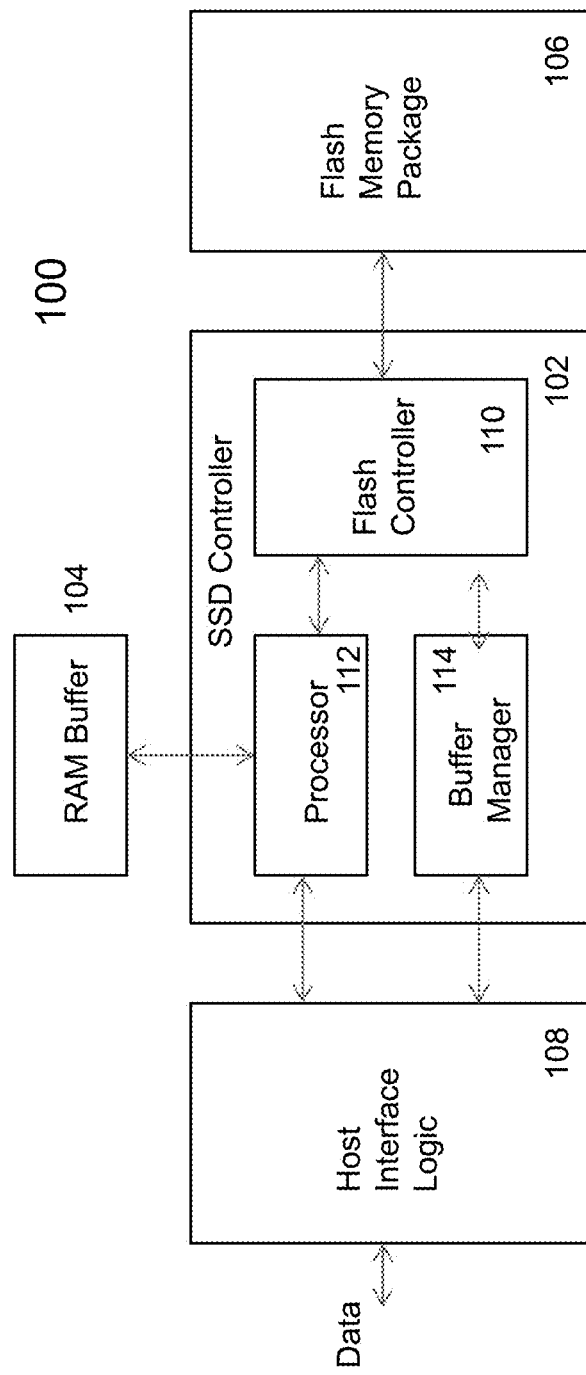
FIG. 1 shows an exemplary architecture of Solid State Device (SSD) that includes an SSD controller, a RAM buffer, a flash memory package and an interface.
Figure 2A:
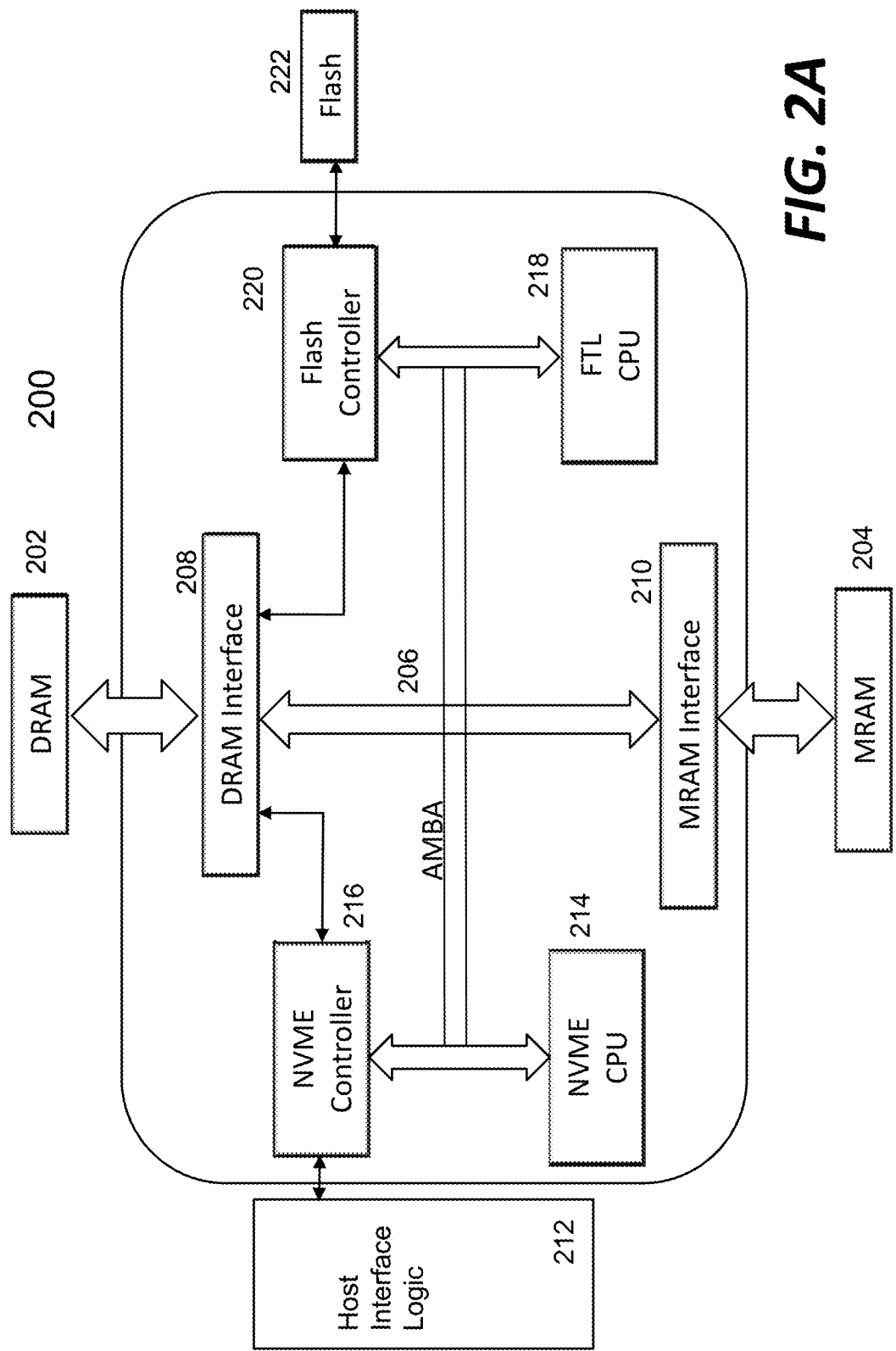
FIG. 2A shows a logic block diagram of an exemplary flash controller according to one embodiment of the present invention.

Referring now to FIG. 2A that shows an exemplary logic block diagram 200 that may be implemented in a storage system or flash controller according to one embodiment of the present invention. Different from the prior art controllers, the controller 200 shows that there are two RAMs, one is DRAM 202 and the other is MRAM 204. One of the benefits, advantages and objects of the present invention is the use of the MRAM 204 that prevents the loss of data when there is a power failure.

DRAM 202 and MRAM 204 are coupled via data lines or data bus 206. According to one embodiment, the data bus is based on the ARM Advanced Microcontroller Bus Architecture (AMBA), an open-standard, on-chip interconnect specification for the connection and management of functional blocks in system-on-a-chip (SoC) designs. To facilitate the communication between the bus 206 and DRAM 202 or MRAM 204, there are a DRAM interface 208 and a MRAM interface 210.

In operation, when a data stream for a file is received in the host interface logic 212. Under the commands of a CPU 214, a controller 216, also referred to as NVME (non-volatile memory express) in one embodiment, is a host controller interface and storage protocol created to accelerate the transfer of the data over the bus 206. In general, a flash memory does not allow data to be updated in place. Most flash memory devices come with a software layer called Flash Translation Layer (FTL) that is responsible for translating logical address from a file system to physical address of flash memory by using mapping tables. The FTL guides a write request arriving from a host into an empty area in flash memory, and manages mapping information in the mapping tables from a logical address recognized by the host to a physical address in a flash memory device.

How to manage the mapping tables impacts directly the performance of the flash storage devices. With respect to the storage performance, as flash memory has the special hardware characteristics, the overall system performance is mainly affected by the write performance. Accordingly, RAM, for example DRAM or SRAM, is often used to manage the mapping tables while the write or read operation is undergoing. As described above, RAM is however prone to power failure. The mapping tables are damaged when they are being updated as data is written into or read out from the flash memory, often resulting in the loss of the data from the flash memory. In a perspective, the relationships between or pairs of logical address and physical address are damaged or non-existent, leading to failed retrieval of the data from the flash memory.

Figure 2B:
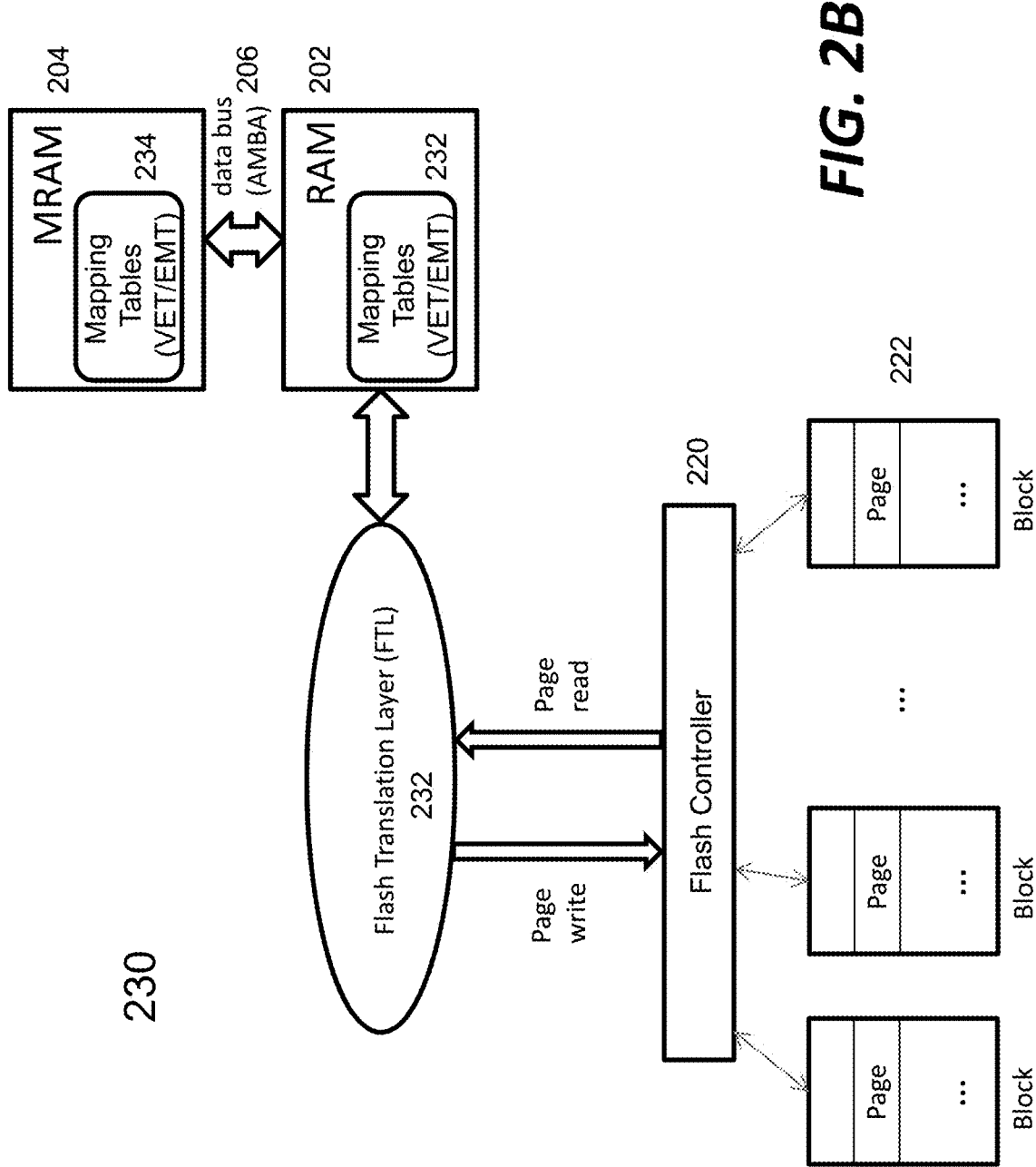
FIG. 2B shows an example in which mapping tables being updated in RAM are being also maintained in MRAM via a data bus.

According to one embodiment, MRAM 204 is used. As described above, MRAM 204 is not prone to power failure. In other words, when there is a power failure, whatever cached or stored in MRAM 204 remains as MRAM 204 works in magnetic domains. In general, data cached in MRAM 204 include one or more mapping tables and various other data to support the writing or reading process. To facilitate the description of the present invention, only the mapping tables are described herein to be updated, moved, cached, stored or otherwise processed in a RAM and an MRAM. Those skilled in the art understand that other data can be equally processed or treated as if they are the mapping tables. To take the advantage of the special characteristics of MRAM 204, the mapping tables being updated in DRAM 202 are copied or transferred to MRAM 204 for backup. In the event, any of the mapping tables being updated in DRAM 202 get damaged, a copy thereof can be retrieved from MRAM 204. FIG. 2B shows an example 230, where the mapping tables 232 being updated in RAM 202 are being also maintained in MRAM 204 via the data bus 206. In other words, the content of the mapping tables 232 is updated in DRAM 202. Depending on operation, the mapping tables 234 in MRAM 204 are accumulated from DRAM 202 when writing data bits into a flash memory or are supplied to DRAM 202 when reading out data bits from the flash memory.

According to one embodiment, the mapping tables 232 in RAM 202 are the ones that are created or updated when data is being written into or read out from the flash memory 222 via a flash controller 220. The flash memory 222 is graphically shown in terms of blocks and pages. It is known to those skilled in the art that a block is the smallest unit in a flash memory that can be erased while a page is the smallest unit in the flash memory that can be programmed (i.e. written therein). The common block size is typically in a range of 4-8 MB in size and the common page size is typically in a range of 8-16 KB in size. The architecture of NAND flash memories dictate that data is written or read in pages, typically between 4 KiB and 16 KiB in size, but can only be erased at the level of entire blocks consisting of multiple pages and MB in size.

Figure 2C:
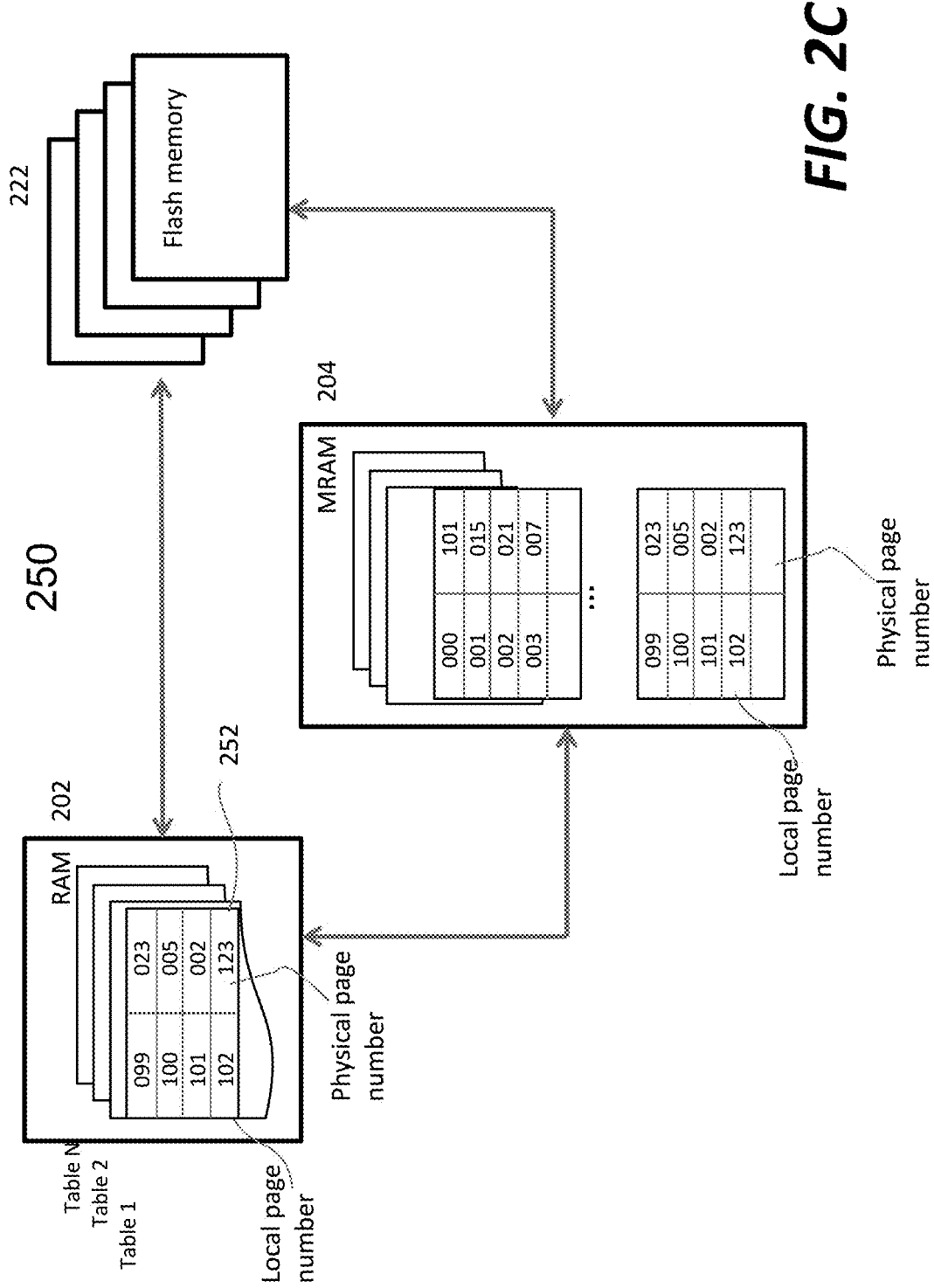
FIG. 2C shows an illustration of an updated portion of the mapping tables in a RAM are copied into an MRAM.

At least some or all of the mapping tables 232 in RAM 202 are duplicated in MRAM 204 via the data bus 206. Depending on implementation, the mapping tables 232 in RAM 202 may be copied to MRAM 204 in their entirety, a latest version of the mapping tables 232 in RAM 202 are copied to MRAM 204 or portions of the mapping tables 232 in RAM 202 are moved to MRAM 204. FIG. 2C shows an illustration 250 of updated portions 252 of the mapping tables in RAM 202 are moved into MRAM 204 so that RAM 202 has spaces for creating or updating new portions of the mapping tables when data is being written into the flash memory 222.

To facilitate the description of the embodiment, FIG. 2C shows only one mapping table 252 that includes relationships between local page numbers and corresponding physical page numbers. When data is being written into or read out from a flash memory, the mapping table 252 is updated constantly in RAM 202. According to one embodiment, the mapping table 252 in RAM 202 is only a portion of an entire mapping table keeping the relationships between the local page numbers and the physical page numbers. When the data is being written into the flash memory 222, the mapping table 252 is expanded in RAM 202. In operation, the portion of the mapping table is increased by one relationship or pair when a page of data bits is written into the flash memory. In other words, for every page written into the flash memory 222, a new pair of local page number and physical page number is added to the mapping table 252 (a portion of an entire mapping table).

According to one embodiment, anything before this new pair may be moved to MRAM 204 so additional new pairs can be continuously added up or accumulated on top of this new pair. In one embodiment, a fixed number of pairs of logical address and physical address in RAM 202 are moved to or cached in MRAM 204. In operation, as soon as the number of the pairs of the logical address and physical address reaches a predefined number, e.g., 1K, they are moved to MRAM 204, leaving free spaces in RAM 202 for continuing to create new pairs. As a result, the capacity requirement for RAM 202 is considerably lower than that for RAM without MRAM 204.

FIG. 2C shows that the mapping table in MRAM 204 is expanding as new pairs of the logical address and physical address are moving in from RAM 202. When there is a power failure, RAM 202 would fail, anything in RAM 202 would be lost. As a result, the mapping table 252 in RAM 202 becomes no longer available. But everything stored in MRAM 204 remains intact. When the power is restored, the latest relationships or pairs in MRAM 204 can be copied to RAM 202 for the FTL 232 to continue the page writing process (namely for the controller 220 to write the data into the flash memories 222). When the data is all stored in the flash memory 222. A complete mapping table in MRAM 204 may be stored in the flash memory 222 as well. Those skilled in the art shall appreciate other mapping tables may be handled in the similar fashion as described herein.

When the data is being read out from the flash memory 222, the mapping table 252 is also updated in RAM 202. As soon as a file is identified, corresponding mapping tables are loaded into MRAM 204, where MRAM 204 is controlled to release respective portions of the mapping tables to RAM 202 periodically or on demand till the data for the file is fully fetched from the flash memory 222. When there is a power failure, RAM 202 would fail, anything in RAM 202 would be lost. But the mapping tables in MRAM 204 are still there. When the power is restored, the address pairs in MRAM 204 that were copied to RAM 202 before the power failure can be copied again to RAM 202 for the FTL 232 to continue the readout process.

Figure 2D:
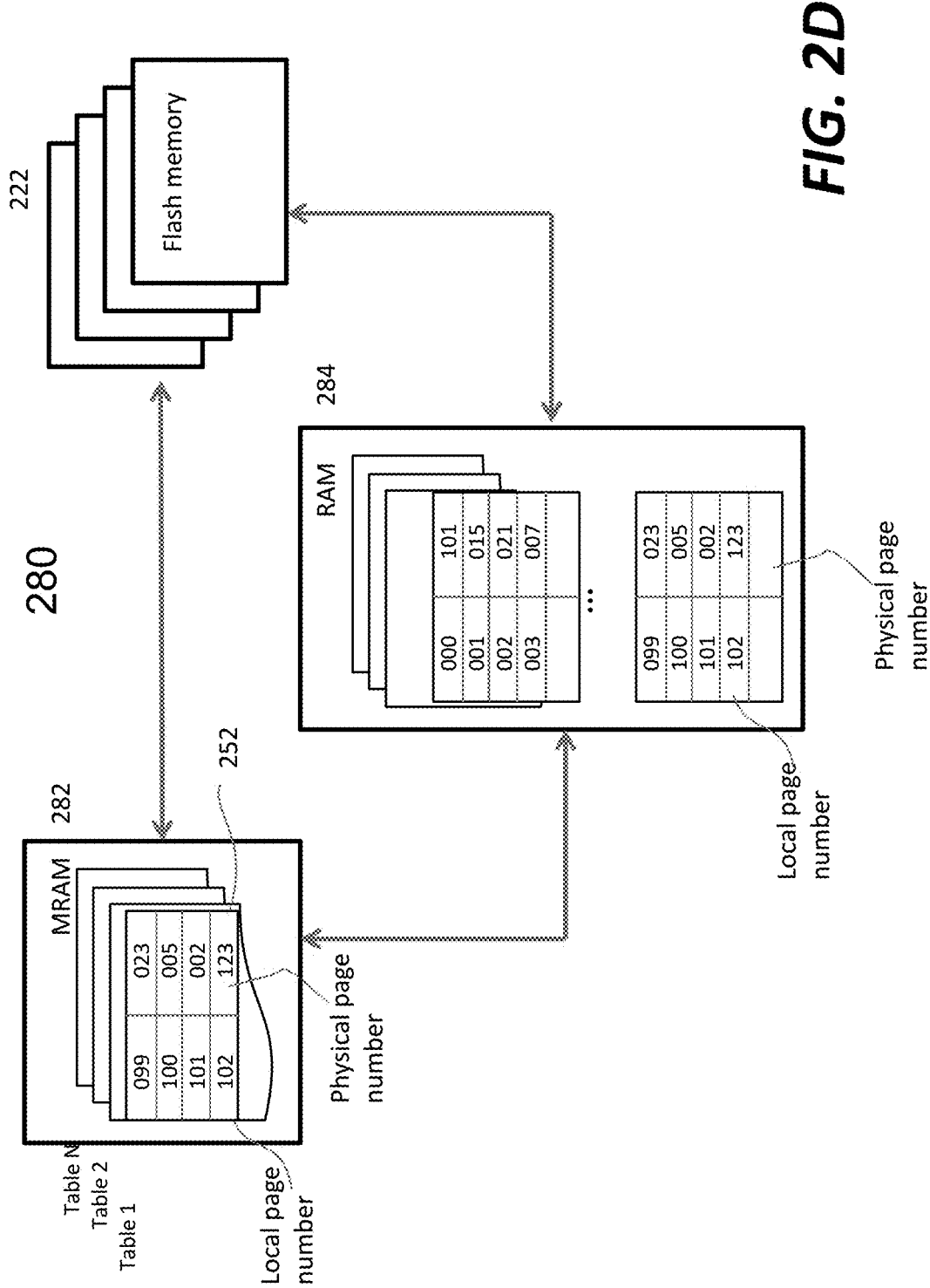
FIG. 2D shows an illustration of an updated portion of the mapping tables in an MRAM are copied into a RAM.

According to another embodiment, the respective functions of the RAM and MRAM are swapped, as shown in FIG. 2D. The MRAM 282 is provided to update the mapping tables and the RAM 284 is employed as a cache and coupled to the flash memory for final deposit of the mapping tables when writing or reading process is completed. In the event of power failure while writing data into or reading data from the flash memory, the data cached in the RAM 282 would be damaged but some of all of the content in the MRAM 284 can be copied to the RAM 282 to continue the writing or reading process.

Figure 3:
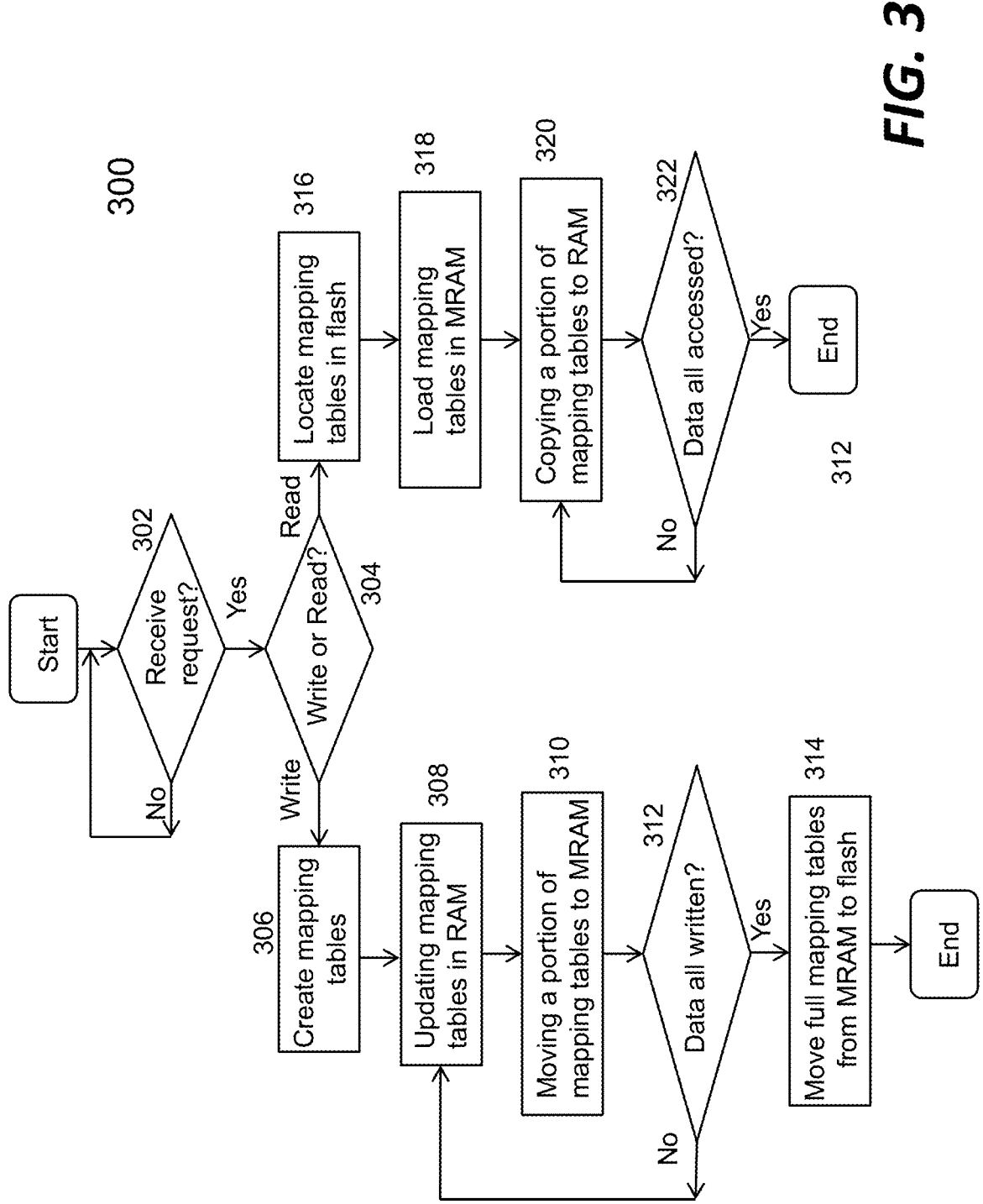
FIG. 3 shows a flowchart or process of a data stream being written into or reading out a data stream from a flash array according to one embodiment of the present invention.

FIG. 3 shows a flowchart or process 300 of data bits of a file (or a data stream) being written into or read out from a flash array according to one embodiment of the present invention. The flowchart 300 may be better appreciated in view of FIGS. 2A-2C and implemented in hardware or in combination of software (e.g., firmware) and hardware, where the software is executed in a processor provided to control the operation of the RAM and MRAM employed to manage the mapping tables. The flowchart 300 starts when a command is received or coupled in at 302, where the command is related to storing a data stream into a flash memory or reading out a data file from the flash memory. The data stream may be pertaining to a file, a photo and an audio/video created or from a host device (e.g., a laptop computer or the Internet). When a user desires to store a file into a storage device (e.g., SSD), a command or request referring to the data of the file is received at 302. Similarly, when a user desires to access a file stored in a storage device (e.g., SSD), a command or request referring to the data of the file is received at 302.

At 304, the process 300 determines if the request is to write a file into the flash memory or to read out a file stored in the flash memory. It is now assumed that the request is to write a file into the flash memory and further assumed that the data for the file has been preprocessed in a sense that the data has been segmented in equal sizes related to a page size of the flash memory and/or error correction encoded. As described above, it is important to record where each data bit is stored physically in a cell of the flash memory. Accordingly, mapping tables are used for record the information about where each data bit is stored physically in the flash memory.

According to one embodiment, necessary mapping tables are created by the processor executing the firmware to create the mapping tables when the flash memory is first time used or loading existing mapping tables into the MRAM. Different from the prior art system, the MRAM is not used to update the mapping tables but serves as a cache to keep the mapping tables in their entirety. Only a portion of the mapping tables are copied to the RAM, where the MRAM and the RAM are coupled via a data bus. When new mapping tables are created in the RAM and constantly updated while the data bits are written into the flash memory, respective portions of the updated mapping tables (e.g., after a number of clocks or a predefined length of each of the portions) are transported to the MRAM, where the arrived portions of the updated mapping tables are added to the MRAM.

As an example, FIG. 2C shows that the arrived portions of the updated mapping tables are cascaded respectively to corresponding mapping tables that are already in the MRAM 204. Similarly, when the flash memory has been used before, the existing mapping tables are initially stored in the flash memory and loaded into the MRAM 204. Under the instruction from the processor or microcontroller, portions of the mapping tables are transported to RAM, where the portions of the mapping tables are used for the RAM to start updating or expanding these partial mapping tables at 308. As the data continues to be written into the flash memory, portions of the updated mapping tables are cached back in the MRAM at 310.

At 312, the process 300 determines if all of the data has been written into the flash memory. If not, the process 300 returns to 308 and continue updating or expanding the mapping tables while writing the data into the flash memory. If all of the data has been written into the flash memory, the process 300 moves to 314, where the mapping tables in the MRAM are moved to the flash memory for storage.

Now returning to 304, it is assumed that the request is to access or read out a file stored in the flash memory. At 316, the mapping tables for the flash memory are located and loaded into the MRAM 318. Under the instruction from a processor or microcontroller, respective portions of the mapping tables are transported to the RAM at 320, where the portions of the mapping tables are used to guide the location of the data bits in the flash memory. As the data bits are being read out from the flash memory, the portions of the mapping tables are updated. In a perspective, once the data bits are properly written into the flash memory, there is no need to keep those particular portions of the mapping tables in the RAM as they will not be updated. Accordingly, the portions of the mapping tables are no longer needed in the RAM. At certain point or before the portions of the mapping tables are fully used or the requested data has not been fully read out at 322, another set of portions of the mapping tables are arrived in the RAM from MRAM at 320. The loop of 320 to 322 continues till all of the data bits for the requested file are read out. The data coming out from the process 300 may then be processed (e.g., decoding via error correction and etc.).

It can be appreciated that at any moment there is a power failure, the portions of the mapping tables in the RAM would be damaged, but the MRAM acts as a cache to keep a copy of what has been damaged in the RAM. The copy can be immediately loaded again into RAM as soon as the power is restored. The writing process and the reading process could be continued without the loss of the data in the flash memory.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

We claim:

1. A storage system comprising:
   a magnetic RAM random access memory (MRAM) provided to maintain at least one mapping table to track where data bits of a file are stored in a flash memory; and
   a random access memory (RAM), coupled to the MRAM via a data bus, provided to update some or all of the at least one mapping table, wherein the RAM is caused to retrieve a portion of the at least one mapping table from the MRAM, the retrieved portion of the at least one mapping table is actively updated in the RAM as data bits are being written into or read out from the flash memory, wherein updates to the retrieved portion of the at least one mapping table in the RAM are written back to the MRAM and another portion of the at least one mapping table from the MRAM is copied to the RAM, wherein the another portion of the at least one mapping table in the RAM is damaged and the at least one mapping table in the MRAM is maintained when there is a power failure to the storage system, the at least one mapping table is eventually copied from the MRAM and saved in the flash memory.

2. The storage system as recited in claim 1, wherein the at least one mapping table provides relationships between respective local addresses and physical addresses of the data bits in the flash memory.

3. The storage system as recited in claim 2, wherein anything maintained in the RAM is damaged or lost whenever the RAM is disconnected from power while any of the at least one mapping table cached in the MRAM remains.

4. The storage system as recited in claim 3, wherein the portion of the at least one mapping table in the RAM is expanded as the data bits are written into the flash memory, a predefined amount of the portion of the at least one mapping table in the RAM is moved to the MRAM.

5. The storage system as recited in claim 4, further comprising:
   a processor, coupled to the RAM and the MRAM, provided to keep track of the portion of the at least one mapping table in the RAM and cause the RAM to release the predefined amount of the portion of the at least one mapping table to the MRAM.

6. The storage system as recited in claim 5, wherein the processor causes the MRAM to return to the RAM a latest portion of the at least one mapping table received from the RAM after the RAM is disconnected from power and then reconnected to the power.

7. The storage system as recited in claim 3, wherein the portion of the at least one mapping table in the RAM is shrunk as the data bits are read out from the flash memory, another portion of the at least one mapping table is moved from MRAM to the RAM when the portion of the at least one mapping table in the RAM is below a threshold.

8. The storage system as recited in claim 7, further comprising:
   a processor, coupled to the RAM and MRAM, provided to keep track of the portion of the at least one mapping table in the RAM and cause the MRAM to release the another portion of the at least one mapping table to move to the RAM periodically or when the portion of the at least one mapping table in the RAM is shrunk to below a threshold.

9. The storage system as recited in claim 8, wherein the processor causes the MRAM to return to the RAM again a latest portion of the at least one mapping table in the MRAM after the RAM is disconnected from power and then reconnected to the power.

10. A method implemented in a storage system, the method comprising:
    maintaining in a magnetic random access memory (MRAM) at least one mapping table to track where data bits of a file are stored in a flash memory;
    retrieving in a random access memory (RAM) a portion of the at least one mapping table from the MRAM, wherein the MRAM and the RAM are coupled via a data bus,
    updating the retrieved portion of the at least one mapping table in the RAM, wherein the portion of the at least one mapping table is actively updated in the RAM as data bits are being written into or read out from the flash memory, wherein updates to the portion of the at least one mapping table in the RAM are written back to the MRAM;
    copying another portion of the at least one mapping table from the MRAM to the RAM, wherein the another portion of the at least one mapping table in the RAM is damaged and the at least one mapping table in the MRAM is maintained when there is a power failure to the storage system; and
    saving the at least one mapping table from the MRAM in the flash memory.

11. The method as recited in claim 10, wherein the at least one mapping table provides relationships between respective local addresses and physical addresses of the data bits in the flash memory.

12. The method as recited in claim 11, wherein anything maintained in the RAM is damaged or lost whenever the RAM is disconnected from power while any of the at least one mapping table cached in the MRAM remains.

13. The method as recited in claim 12, wherein the portion of the at least one mapping table in the RAM is expanded as the data bits are written into the flash memory, a predefined amount of the portion of the at least one mapping table in the RAM is moved to the MRAM.

14. The method as recited in claim 13, further comprising:
    keeping track of the portion of the at least one mapping table in the RAM in a processor coupled to the RAM and the MRAM; and
    causing the RAM to update the predefined amount of the portion of the at least one mapping table to the MRAM.

15. The method as recited in claim 14, wherein the processor causes the MRAM to return to the RAM a latest portion of the at least one mapping table received from the RAM after the RAM is disconnected from power and then reconnected to the power.

16. The method as recited in claim 12, wherein the portion of the at least one mapping table in the RAM is shrunk as the data bits are read out from the flash memory, another portion of the at least one mapping table is moved from MRAM to the RAM when the portion of the at least one mapping table in the RAM is below a threshold.

17. The method as recited in claim 16, further comprising:
    keeping track of the portion of the at least one mapping table in the RAM in a processor coupled to the RAM and the MRAM; and
    causing the MRAM to release the another portion of the at least one mapping table to move to the RAM periodically or when the portion of the at least one mapping table in the RAM is shrunk to below a threshold.

18. The method as recited in claim 17, wherein the processor causes the MRAM to return to the RAM again a latest portion of the at least one mapping table in the MRAM after the RAM is disconnected from power and then reconnected to the power.

\* \* \* \* \*